Oct. 21, 1924.

G. INNES

GRAIN SHOCKER

Filed Dec. 23, 1919   10 Sheets-Sheet 4

1,512,768

Inventor-
George Innes,
by his Attorneys
Howson & Howson

Oct. 21, 1924.  
G. INNES  
GRAIN SHOCKER  
Filed Dec. 23, 1919    10 Sheets-Sheet 7

1,512,768

Inventor:—  
George Innes.  
by his Attorneys:—  
Howson & Howson

Oct. 21, 1924.

G. INNES 1,512,768

GRAIN SHOCKER

Filed Dec. 23, 1919    10 Sheets-Sheet 8

Inventor
George Innes.
by his Attorneys
Howson & Howson

Oct. 21, 1924.
1,512,768
G. INNES
GRAIN SHOCKER
Filed Dec. 23, 1919    10 Sheets-Sheet 9

Inventor—
George Innes.
by his Attorneys
Howson & Howson

Oct. 21, 1924.　　　　　　　　　　　　　　　1,512,768
G. INNES
GRAIN SHOCKER
Filed Dec. 23, 1919　　10 Sheets-Sheet 10

Inventor
George Innes.
by his Attorneys

Patented Oct. 21, 1924.

1,512,768

UNITED STATES PATENT OFFICE.

GEORGE INNES, OF PHILADELPHIA, PENNSYLVANIA, ASSIGNOR TO INNES SHOCKER COMPANY, OF PHILADELPHIA, PENNSYLVANIA, A CORPORATION OF DELAWARE.

GRAIN SHOCKER.

Application filed December 23, 1919. Serial No. 346,843.

*To all whom it may concern:*

Be it known that I, GEORGE INNES, a citizen of the United States, residing in Philadelphia, Pennsylvania, have invented certain Improvements in Grain Shockers, of which the following is a specification.

My invention relates to certain improvements in means for shocking grain in the field as it is delivered from a reaper and binder. My invention relates particularly to the basket and the means for operating the same.

Other parts of the shocker and detailed mechanism connected therewith are described and claimed in a companion application filed January 6, 1920, Serial No. 349,706.

One object of my invention is to provide means for discharging the shock formed in the basket so that it will be properly located on the ground and the position of the bundles in the basket will not be disturbed until the basket is finally withdrawn from the shock.

A further object of the invention is to provide means whereby the basket is entirely free to fall, when once released, remaining momentarily with the shock until it has settled on the ground, after which it is withdrawn from the shock, while the reaper and binder, and the mechanism connected therewith, are moving forward.

A still further object of the invention is to construct the basket and the mechanism connected therewith so that, when the basket falls with the shock, there is a certain amount of dwell in order that all portions of the base of the shock may be in contact with the ground and the shock may become inert before the basket is removed therefrom. The quick action of the basket, on removal, leaves the shock undisturbed.

Still another object of the invention is to design the mechanism so that when the shock is delivered on a curve, the basket will be kept in alignment with the shock instead of in alignment with the machine with which it is connected, thus preventing the disarrangement of the shock on the withdrawal of the basket.

Figure 7:
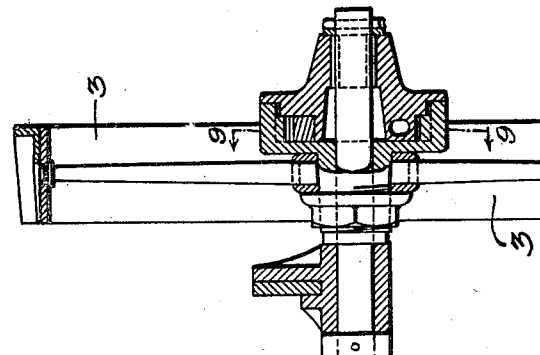
Fig. 7 is a sectional view on the line 7—7, Fig. 6.
Figure 16:
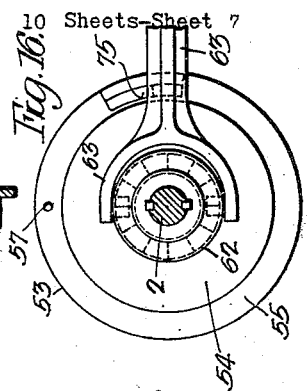
Figure 8:
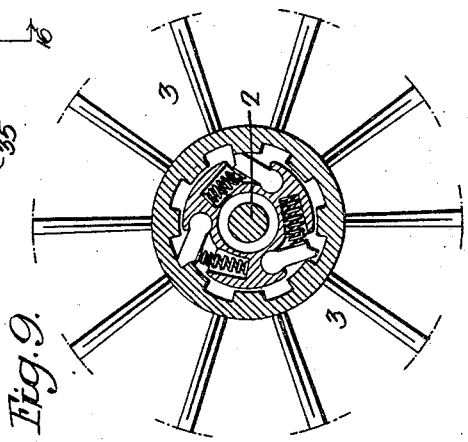
Fig. 8 is a section on the line 8—8, Fig. 5.
Figures 9, 17:
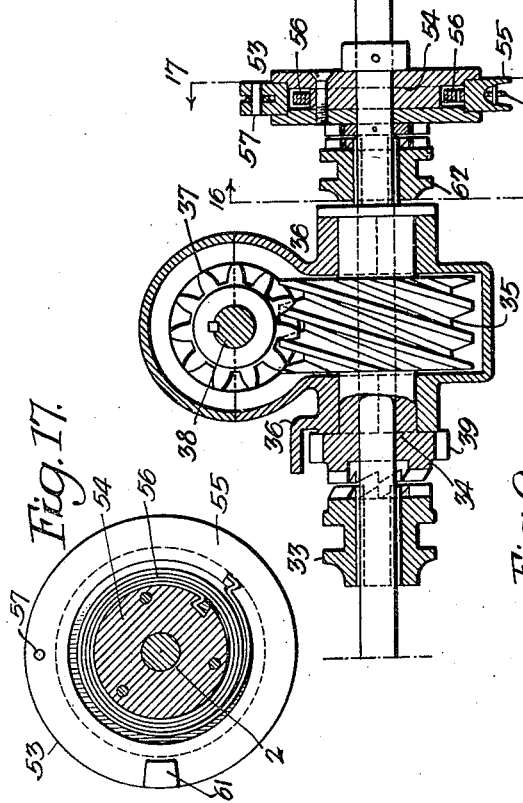
Fig. 9 is a section on the line 9—9, Fig. 7.
Figure 15:
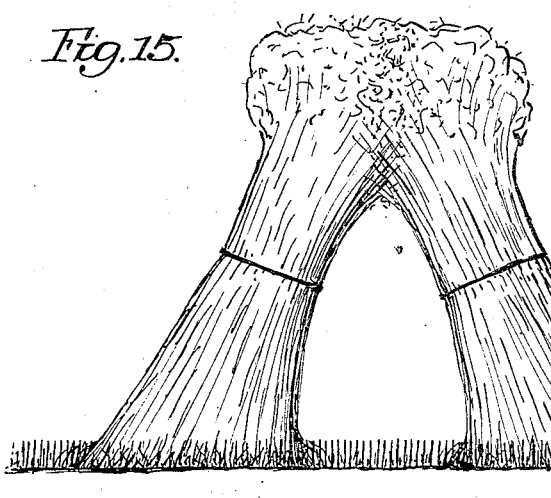
Figure 11:
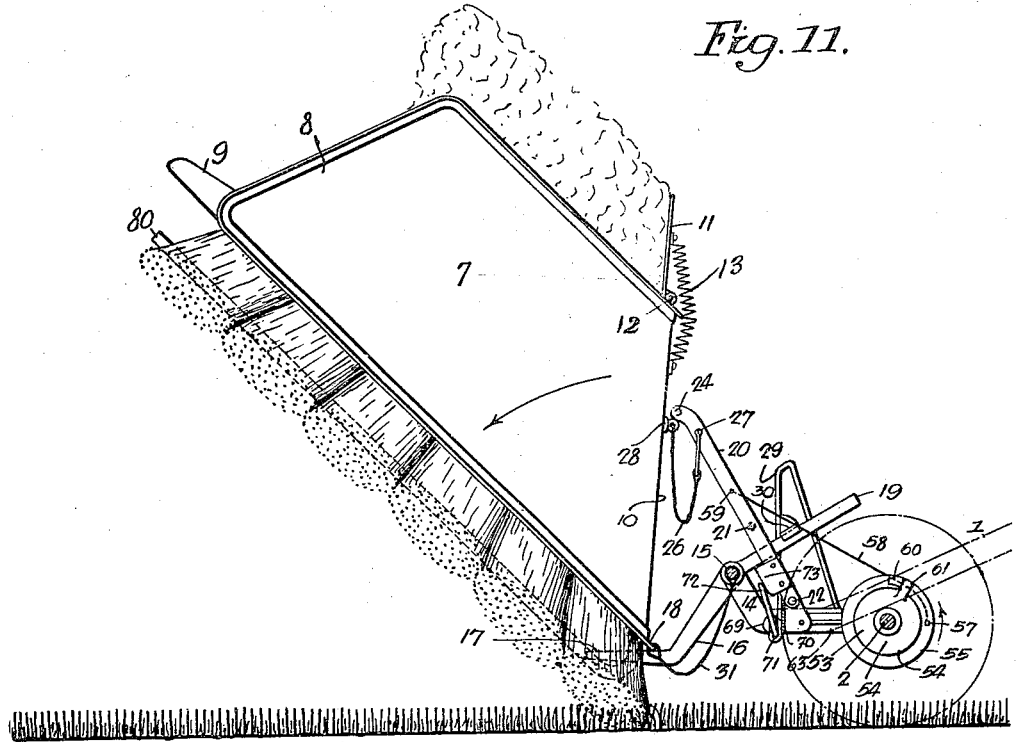

Figs. 10 to 14, inclusive, are diagram views illustrating the operation of the mechanism in discharging the bundles of grain from the basket to the ground;

Fig. 15 is an end view of one of the shocks;

Fig. 16 is a sectional view on the line 16—16, Fig. 7;

Fig. 17 is a sectional view on the line 17—17, Fig. 7;

Fig. 18 is a perspective view of the basket controlling bar;

Fig. 19 is a view illustrating a detail of the invention.

Figure 1:
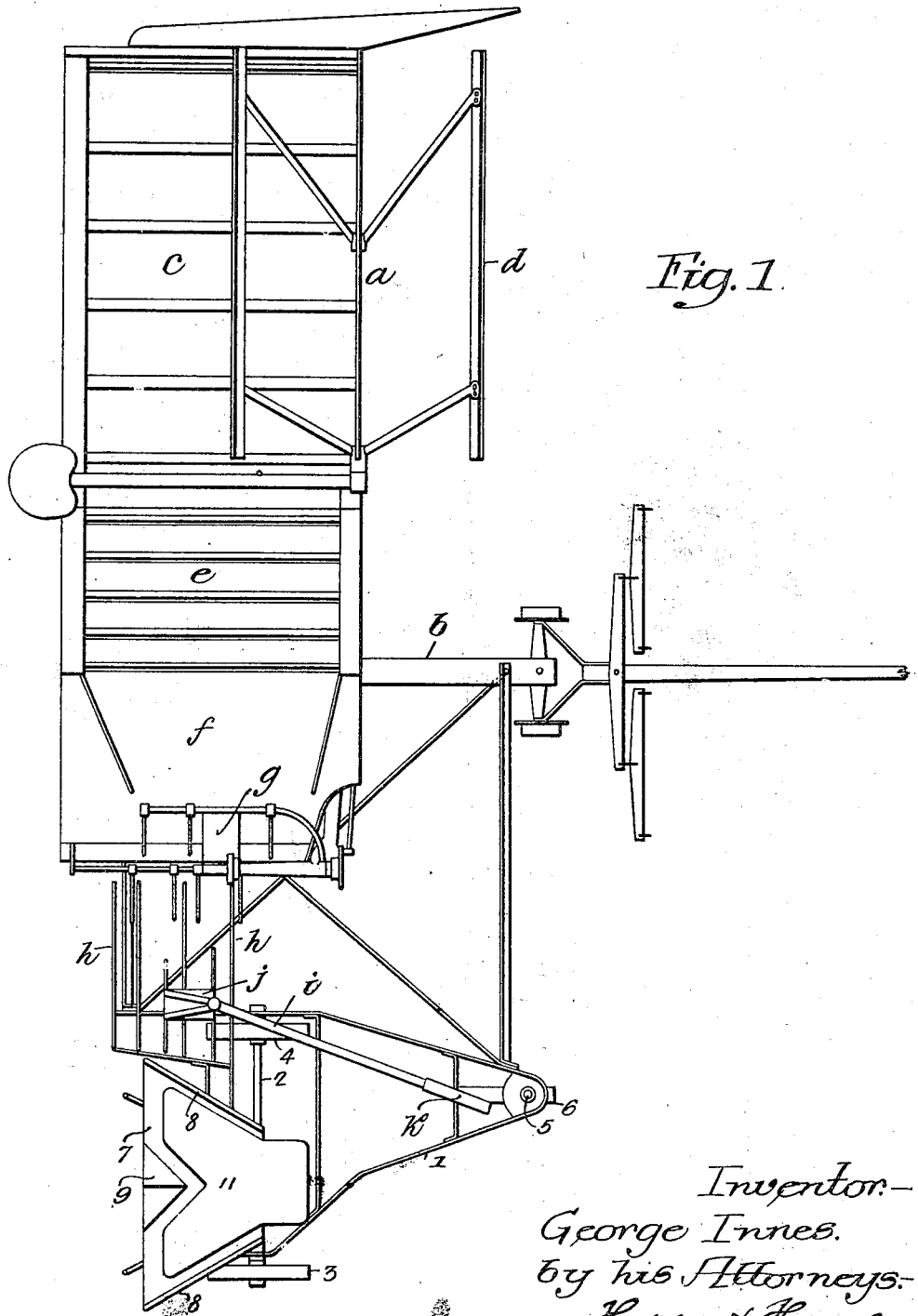
Fig. 1 is a plan view of a reaper and binder, illustrating the shocking mechanism connected therewith.

Referring to Fig. 1, *a* is a reaper and binder of any ordinary type, having a beam *b* to which the tongue is secured. *c* is the apron. *d* is the reel. *e* is an inclined apron, which receives the grain from the apron *c* and delivers it to the inclined deck *f*, at which point the binding mechanism *g* forms the bundles and ties the bands. *h* is the cradle into which the bundles are delivered after they have been bound. This cradle, in the present instance, is so arranged as to receive two bundles, one after the other. *i* is a boom mounted on a mast *k* carried by the frame 1 of the shocking machine and a gripper *j* is mounted on the end of the boom. The detail mechanism of the above parts of the shocking machine is fully described and claimed in the companion application hereinbefore alluded to.

1 is the frame of the shocker, which is supported at one end by an axle 2 having traction wheels 3 and 4. The opposite end of the frame is carried by a swiveled bearing 5 having a wheel 6. The wheels 3 and 4 are driving wheels and are supplied with cleats, or other projections, which engage the ground. The wheel 6 is simply a caster wheel for the forward end of the frame. The frame 1 is connected to the frame of the binder in any suitable manner, preferably by rods, so that it will travel with the binder. It will be understood that the frame of the shocker moves with the binder, while the basket, carried by the frame, is discharged and returned to its first position without interfering with the forward movement of the binder and frame.

Figure 4:
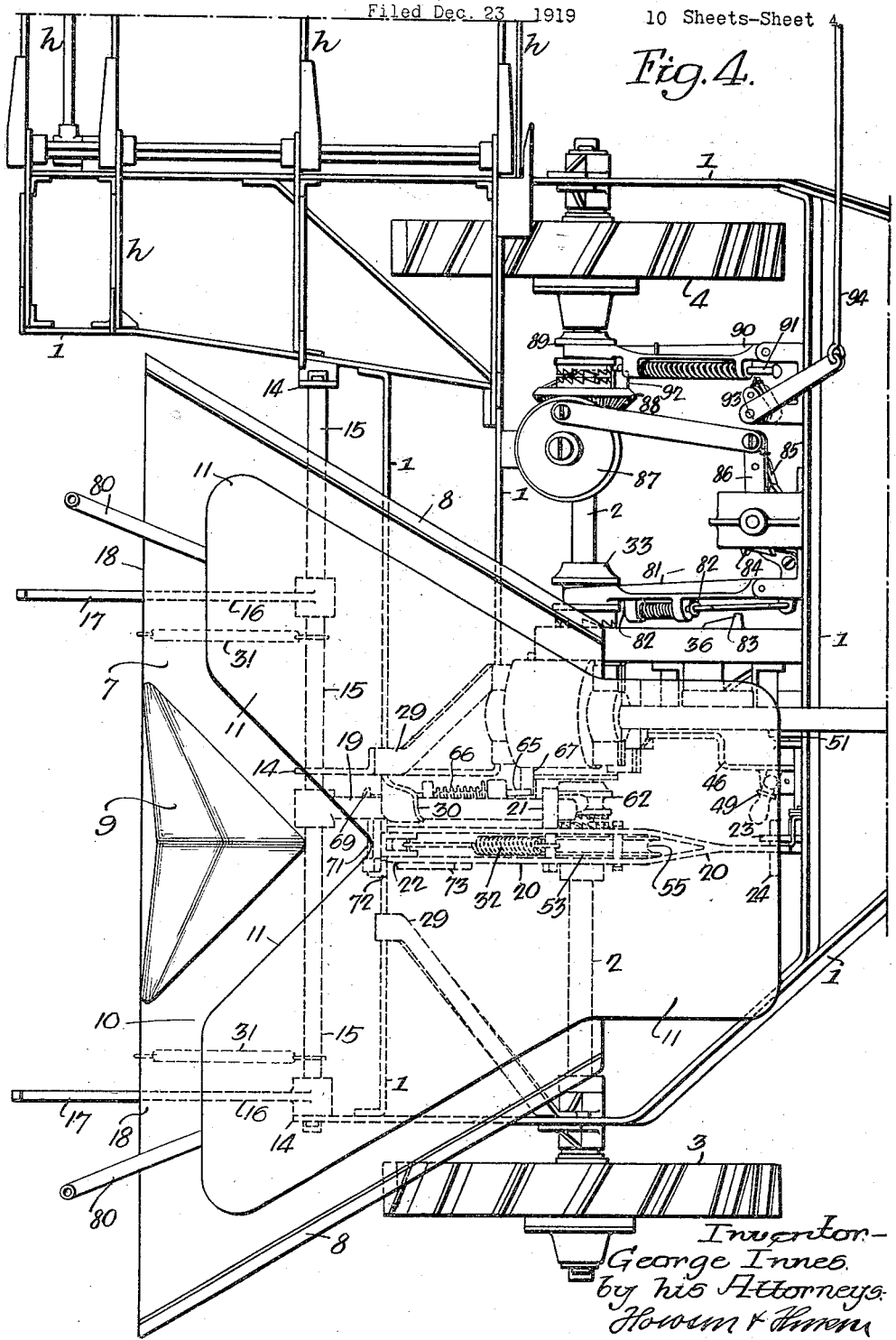
Fig. 4 is a plan view of the basket and the mechanism connected therewith by which it is operated, the mechanism controlling the other parts of the shocker being omitted.

7 is a basket, made as clearly shown in the drawings, having side members 8, which are closer together at the forward end than at the rear end, and a centrally located fixed section 9 tapered in cross section, the taper, in the present instance, being clearly shown in Fig. 4 of the drawings. The basket has an inclined bottom 10 and a receiving platform 11, which is pivoted at 12 to the front end of the basket, and is provided with a spring 13, which holds the platform in the horizontal position when the basket is empty but which, when turned on its pivot, assumes a position in the bottom of the basket when the first pair of bundles is dropped into the basket. This platform extends in advance of the basket a certain distance and is bifurcated at the rear end so as to extend on each side of the central partition 9. The object of this platform is to insure the positioning of the bundles in the basket, preventing the bundles reversing themselves when dropped by the gripper and insuring the butt ends of the bundles being located in the proper position, as, in some instances, the heads of the grain are so heavy that they have a tendency to drop in advance of the stalks and enter the basket in a reverse position. The platform also prevents the heads of the grain hanging over the front edge of the basket.

Figure 2:
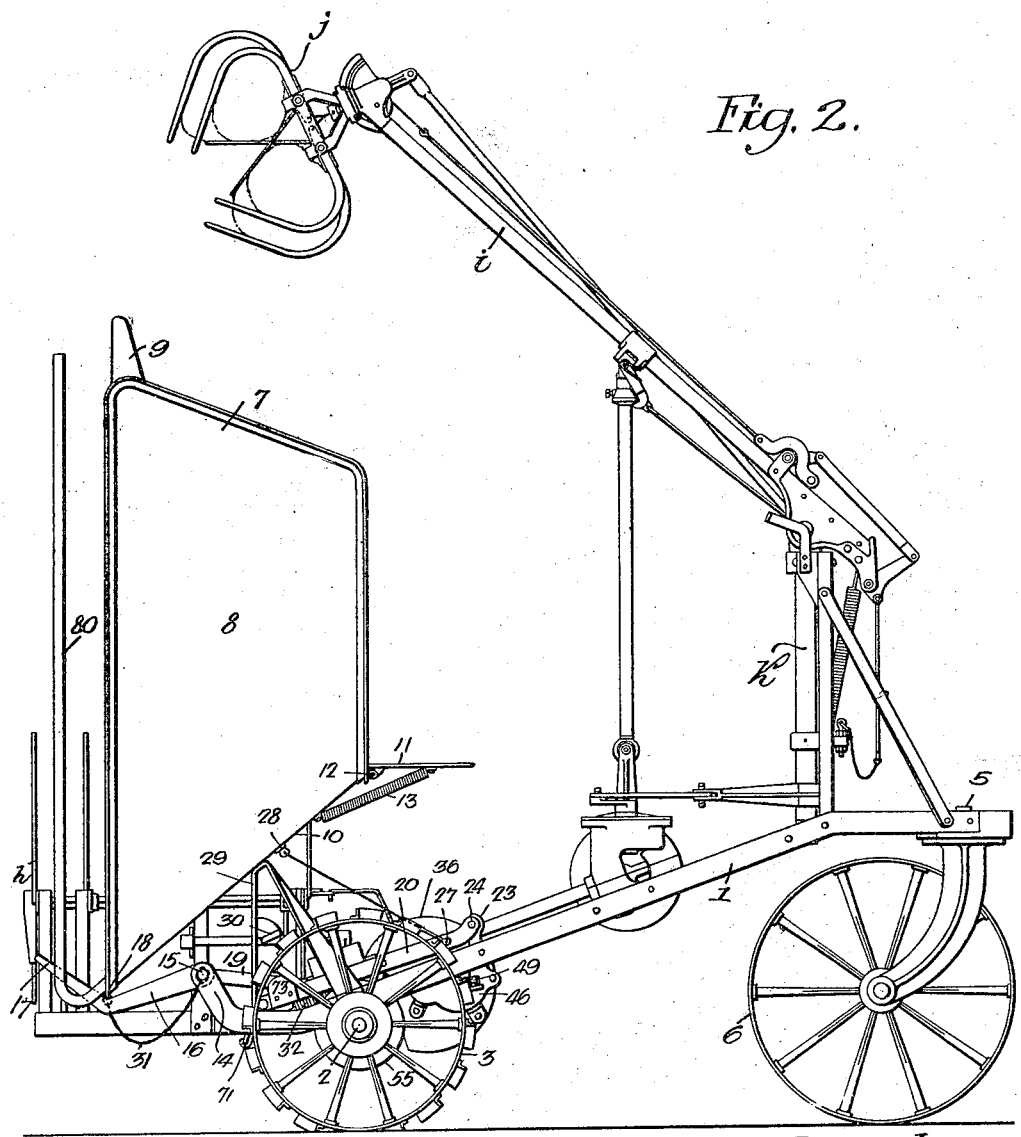
Fig. 2 is a side view.
Figure 3:
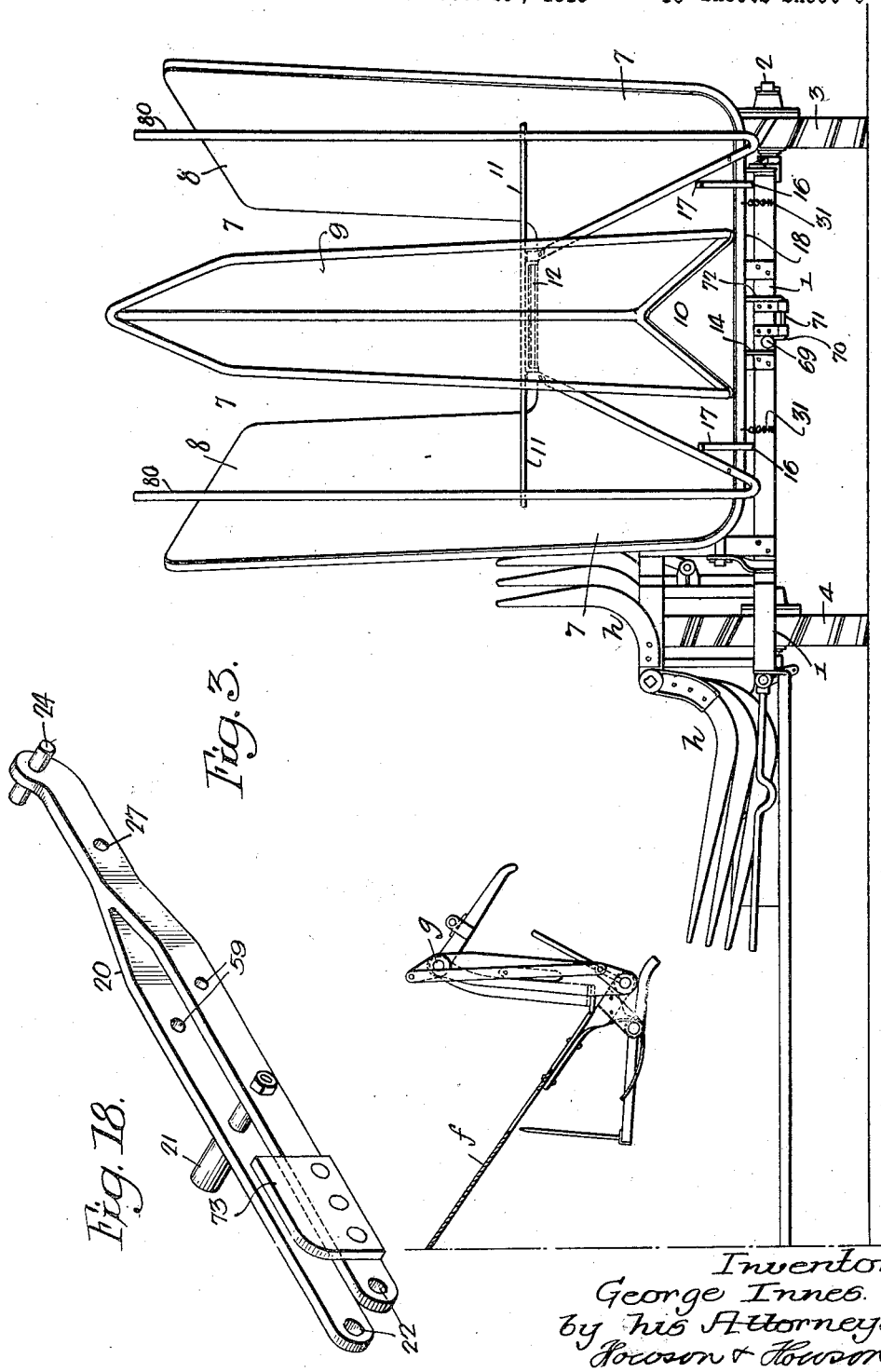
Fig. 3 is a rear view.

Projecting at the rear of the basket are two runners 80, in the present instance, which are connected to the basket at its lower edge, as shown in Figs. 2 and 4. These runners not only act to support the basket when it is discharged and at the ground, but also act as stops for the butt ends of the bundles as they are placed in the basket, holding the bundles in position in the basket until it is withdrawn from the shock.

Mounted at the rear of the frame 1 are bearings 14 for a rock shaft 15. On this rock shaft are two arms 16 having extensions 17 arranged at an angle to the body of the arms and forming a crotch. In the crotch of the arms is located the lower portion 18 of the basket 7.

19 is an arm on the rock shaft located between the two arms 16. This arm extends forward and projects under a pin 21 on a bar 20 pivoted at 22 to a bracket on the frame of the machine. This bar is held by a latch 23, which engages a pin 24 on the bar, as clearly shown in Fig. 5.

26 is a chain, which is attached to the bar at 27 and to the bototm of the basket at 28 and, with the bar, retains the basket in its upright position against a pair of supports 29, which are a part of the fixed portion of the frame. On one of the supports 29 is a stop 30, which acts to limit the upward movement of the arm 19 when released from the control of the latch 23, and holds the rock shaft, and its arms 16, in position with their extensions 17 in substantially a horizontal plane so as to allow the basket to remain stationary as regards forward movement, while the machine is moving forward.

Figure 5:
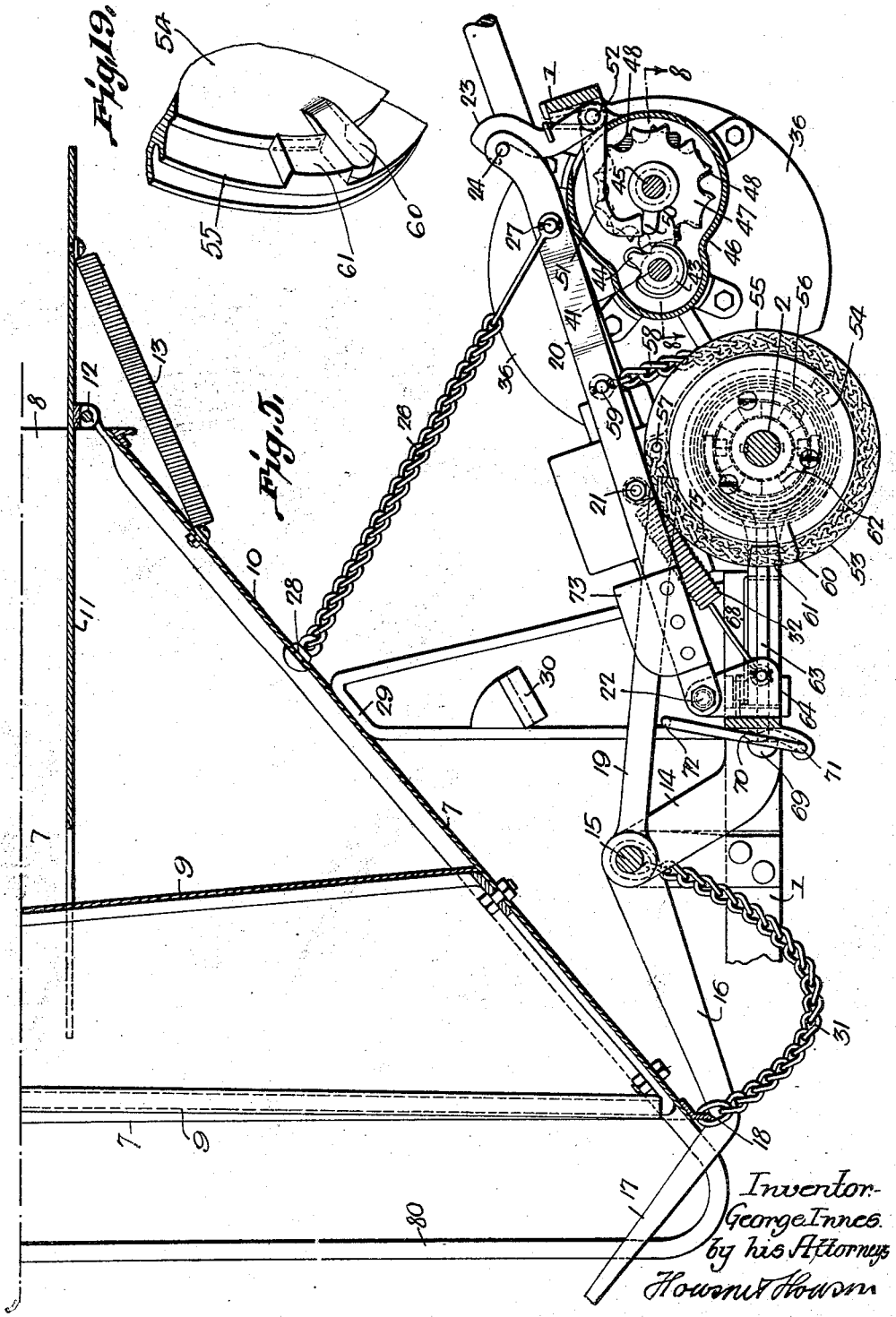
Fig. 5 is an enlarged longitudinal sectional view of the lower portion of the basket and the mechanism for releasing the same and for returning it to its first position.

In order to limit the movement of the basket on the arms 16, I provide chains 31, which are attached to the lower portion 18 of the basket and are hung from the rock shaft 15. It will be noticed that these chains are slack, when the basket is in the elevated position, as shown in Fig. 5, and are of a sufficient length to allow the basket to travel on the extensions 17 of the arms to a point near the ends of the extensions. The length of the chains will depend upon the length of the arms, as, in some types of machines, the extensions of the arms may be comparatively short, while in others the extensions may be of considerable length, as the length of the chains determine the amount of dwell of the basket, irrespective of the forward movement of the machine. While the slack of the chains is being taken up on the forward movement of the machine, the basket is turned over and discharges its load onto the ground, remaining momentarily with the shock. When the slack is fully taken up, the basket is given a jerk, which withdraws it from the standing shock without materially disturbing the equilibrium of the shock.

It will be noticed that the bar 20 is held not only by the latch, as shown in Fig. 5, but also by a spring 32. This spring, when the bar is released and the basket is turned to discharge its load, is expanded and passes the pivot 22, when the bar is in the other extreme position and rests against the rock shaft 15. The spring holds the bar in this position. It will be noticed that the bar is bifurcated and that the spring is located in the recess between the members of the bar. This is a detail of construction and may be modified without departing from the essential features of the invention.

The axle 2 is driven by the traction wheels 3 and 4. These wheels are connected to the shaft by pawl and ratchet mechanism, as shown in Fig. 9, so that there is a positive forward drive, but, when the machine is backed, the wheels do not drive the shaft. On the shaft 2 is a clutch sleeve 33 having teeth which mesh with the teeth on the hub 34 of a worm wheel 35 loose on the shaft and located within a casing 36, which also encloses the worm 37 on a shaft 38, which extends forward and operates the boom $i$ and mask $k$, which carries the gripping mechanism. This mechanism is described and claimed in the companion application.

On the hub 34 is a pinion 39, which meshes with a gear wheel 40 mounted on a shaft 41 having its bearings in the frame 36 secured to the main frame of the machine. On this shaft is a hub 43 having a single tooth 44 of a Geneva movement. On a spindle 45, fixed to a casing 46, are two star wheels 47 and 48 having notches into which the tooth 44 enters, moving the wheel one notch. The wheels are locked between the movement, as is the case in the Geneva movement.

A pivoted lever 49 engages the hub of the wheels 47 and 48 so as to shift either wheel in alignment with the tooth 44 of the hub 43, according to the number of bundles to be loaded in the basket to form a shock. In some instances, this shifting mechanism and the additional star wheel may be dispensed with, in which case the machine handles only a given number of bundles and cannot be adjusted.

On the hub of the wheels 47 and 48 is a lug 50, which comes in contact with an arm 51 on a rock shaft 52, which carries the latch 23 so that, when the arm 51 is raised by the lug, the latch 23 is withdrawn, which releases the bar 20 and the basket. On the shaft 2 is a sheave 53 having a hub section 54 and a grooved rim section 55. A spring 56 is attached at one end to the hub section and at the other end to the rim section 55, so that there is a certain amount of lost motion between the parts for the purpose of allowing the basket to dwell at the ground and to be retracted before it is raised into position to receive the bundles.

Attached to a pin 57 on the rim section 55 is a chain 58, which lies within the groove in the rim section of the sheave and is attached to a pin 59 on the bar 20. This sheave and chain return the basket to the first, or receiving, positon after a shock has been discharged. On the hub section 54 is a lug 60, and on the rim section 55 is a lug 61, Fig. 19, so that the hub section turns almost a complete revolution and takes up the spring 56, after which the lug 60 engages the lug 61 (Fig. 5) and winds the chain 58 on the sheave, returning the bar 20 and the basket 7 to the first position, i. e., the loading position, the latch 23 engaging the pin 24 on the bar, holding the bar in this position.

Figure 6:
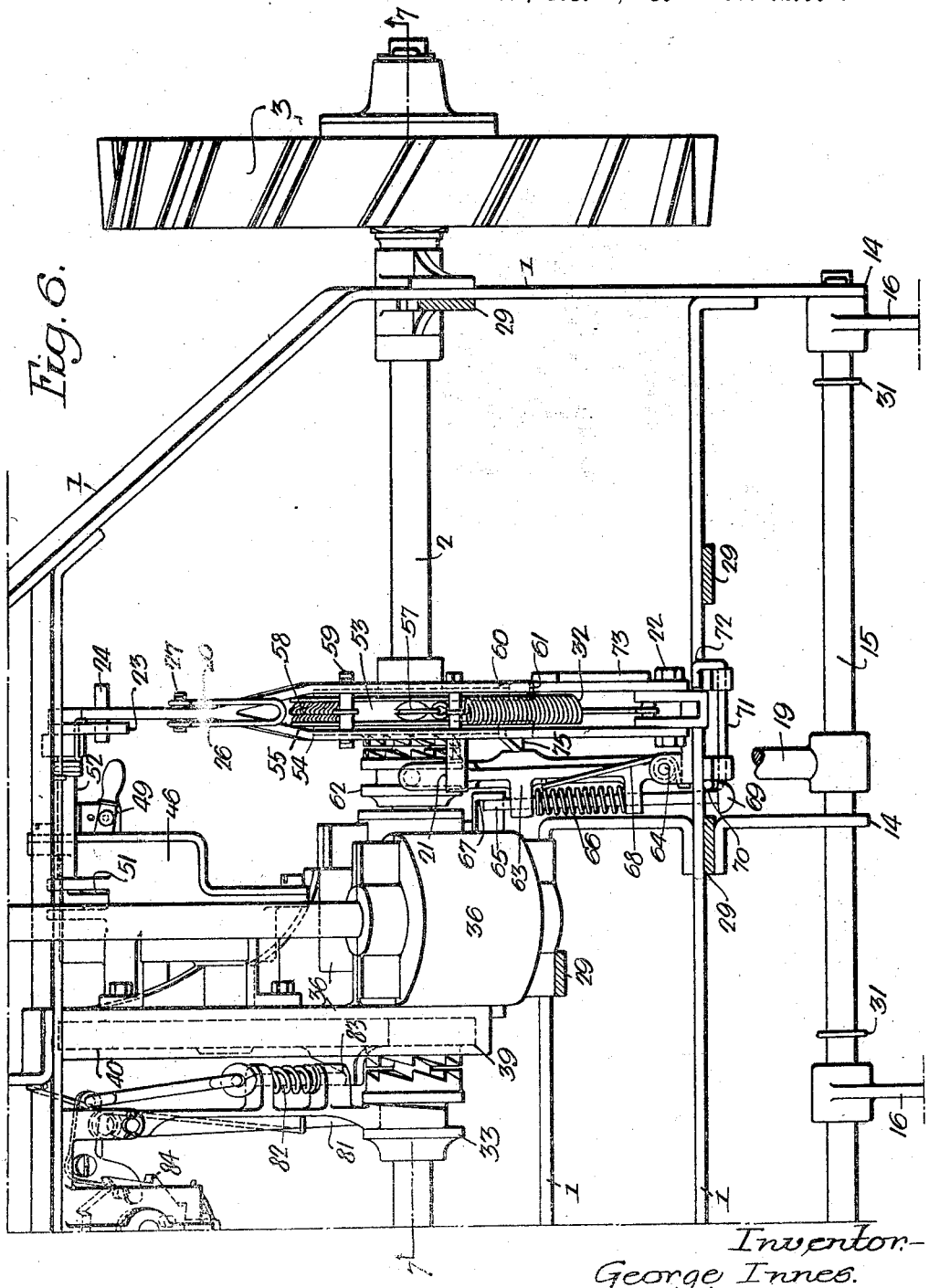
Fig. 6 is an enlarged plan view of the mechanism shown in Fig. 5, the basket being omitted and part of the mechanism being in section.

On the shaft 2 is a clutch sleeve 62 having teeth which engage the teeth on the hub section 54 of the sheave 53. This clutch sleeve 62 is splined to the shaft and is actuated by a lever 63 pivoted at 64 to the frame of the machine and is held in its retracted position by a bolt 65 controlled by a spring 66. This bolt is projected by the spring back of a lug 67 on a fixed portion of the frame. A spring 68 tends to throw the clutch sleeve 62 into engagement with the sheave when the bolt is withdrawn. On the bolt is a head 69, back of which is one arm 70 of a lever 71 mounted on the frame of the machine. The other arm 72 of this lever is shaped, as shown in Figs. 5 and 6, and is engaged by a projection 73 on the bar 20, when the bar is released, and is moved into position to discharge the basket. The moment this projection strikes the arm 72 of the lever, it withdraws the bolt 65 and allows the shifting lever 63 to force the clutch sleeve into engagement with the sheave and, as the machine moves forward, the spring is wound during the first revolution, after which the chain 58 is coiled around the sheave, drawing the bar 20 to its first position. A cam lug 75, on one side of the grooved rim section 55 of the sheave 53, is located so that it will strike the lever 63, Fig. 16, throwing the clutch sleeve 62 out of engagement with the teeth of the hub section 54 of the sheave. The bolt 65 will spring back of the lug 67 and will hold the sleeve 62 out until the lever 63 is again released.

The detailed mechanism above described is one method of controlling the movement of the basket. These details may be modified without departing from the spirit of the invention, as it will be understood that when the basket is used in connection with one type of mechanism, the detail construction will have to be modified to make the basket operate in conjunction with said mechanism.

The operation is as follows: The shocking mechanism is attached to the ordinary reaper and binder and has a basket as hereinbefore described. The entire machine is moved continuously forward, while the grain is being cut and bound into bundles and the bundles placed in the basket and the basket discharged, leaving the bundles on the ground in the form of a shock. As the bundles come from the reaper and binder one at a time, they pass into the cradle $h$. This cradle is arranged to receive two bundles— one after another. The cradle is so arranged that the butt ends of the bundles are separated and the heads are forced together. The gripper $j$, which is attached to the boom $i$, engages both bundles and turns them end for end, placing them in the vertically arranged basket 7. When the first pair of bundles is discharged from the gripper and falls into the basket, the movement of the bundles is checked by the platform 11, which tilts with the weight of the bundles, and the bundles assume an inclined position, as in Fig. 10. This insures the butt ends of the bundles being located in the proper position in the basket. The operation is repeated, until a certain number of bundles are located in the basket. In the present instance, the machine is designed to form either a shock with twelve or fourteen bundles, according to whether the wheel 47 or wheel 48 is in line with the tooth 44 of the hub 43. It will be understood that the machine can be designed so that any predetermined number of bundles can be placed in the basket to form a shock.

Figure 10:
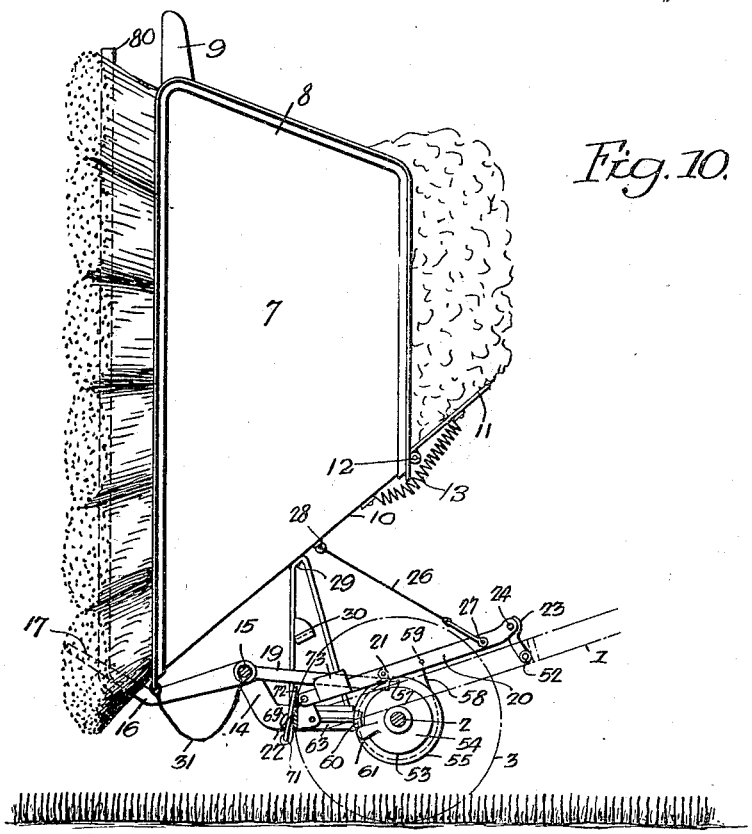

The basket is held in the vertical position, as shown in Fig. 10, by the chain 26, bar 20, and latch 23. When the basket has received a given number of bundles, the latch 23 is automatically withdrawn, immediately releasing the bar to which the basket is attached by the chain 26. As this bar is raised the arm 19 of the rock shaft is released to allow the arms 16 to drop into the position shown in Fig. 11. This overbalances the basket, which falls free of all mechanism, as illustrated in said Fig. 11, so that even if the butt ends of the bundles should come in contact with the ground while the machine is moving forward, their position in the basket would not be interfered with, as the basket is free of the controlling mechanism of the machine.

Figure 12:
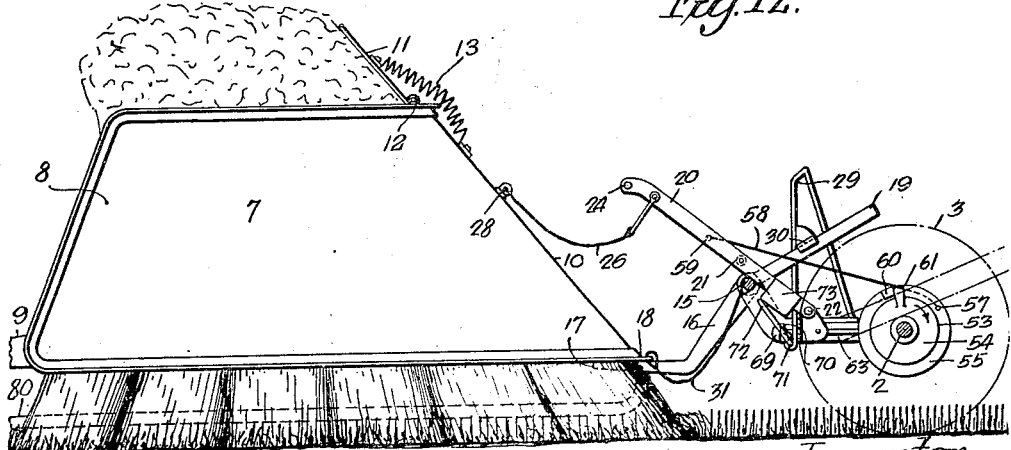
Figure 13:
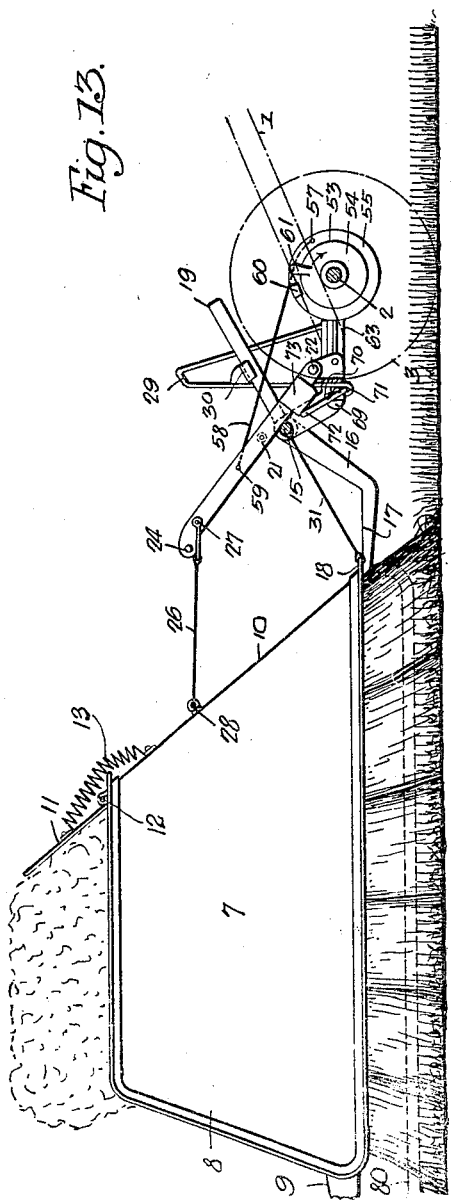
Figure 14:
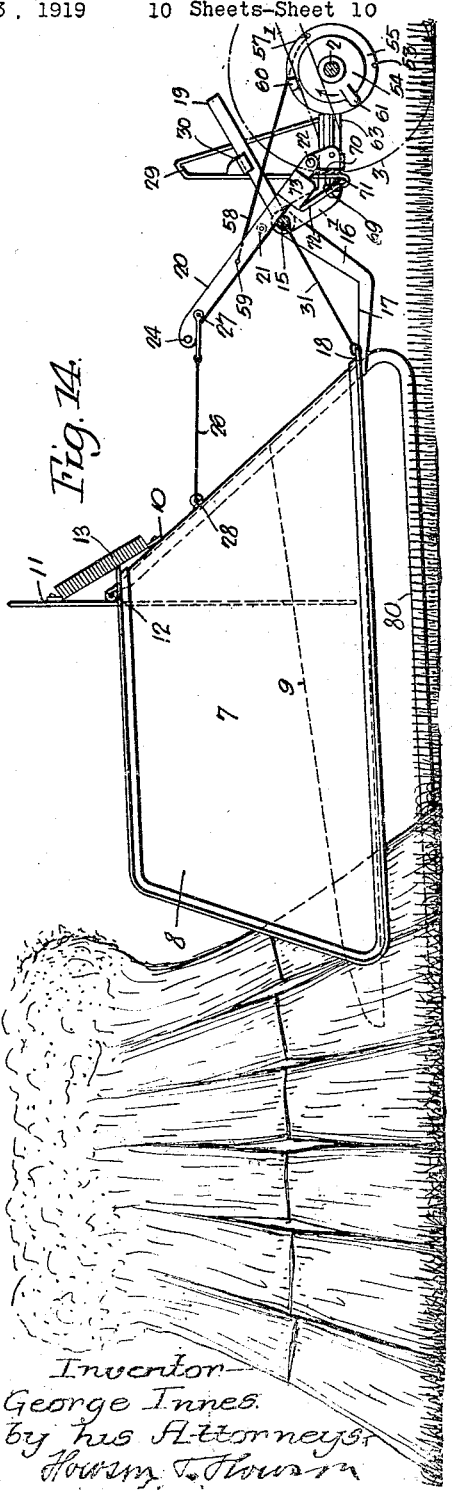

As the basket falls to the position shown in Fig. 12, the butt ends of the bundles forming the shock rest directly on the ground. During this time, part of the slack in the chains 31 has been taken up and the basket remains with the shock until the shock is practically inert. When the slack is fully taken up, as illustrated in Fig. 13, the basket is drawn with a jerk, leaving the shock standing, as shown in Fig. 14, the bundles being in the same relative position in which they were in the basket. By dividing the basket, as shown in Fig. 1, the bundles, forming the shock, are formed in two lines, as in Fig. 15, leaving a clear space between the butts, while the heads are in close contact. In fact, the heads of the bundles are intermeshed to such an extent that one bundle will assist in supporting another in proper position.

The moment the bar 20 is raised to a certain height, the projection 73 on the bar strikes the lever 72, which withdraws the pin 65 and allows the shifting lever 63 to throw the clutch sleeve 62 into engagement with the hub of the sheave 53. As this sheave is now positively turned, the first revolution winds the spring 56 around the hub section 54 before the grooved section 55 turns. Then the lug 60 on the hub section 54 engages the lug 61 on the grooved section 55 and movement is then imparted to the grooved section and to the chain 58, which is connected to it. This chain is connected to the bar 20 so that, as the chain is wound on the sheave, the bar is returned to its original position, and, as it is returning, the pin 21 acts upon the lever 19 of the rock shaft 15 and the arms 16 of this rock shaft are raised to the normal position, as in Fig. 5, and, as the basket assumes its vertical position, the latch 23 engages the bar 20, holding it in the fixed position, and the basket firmly against the supports 29 and in the crotch of the levers 18. At the same time, the cam plate 75 on the grooved section 55 of the sheave 53 strikes the lever 63 and throws the clutch sleeve 62 out of engagement with the hub section of the sheave.

The basket, as it assumes its vertical position, slides upon the extensions of the arms 16, and the chains 31 can become slack and can remain in this position until the basket is again discharged.

It will be seen from the above description of the operation of the machine that the moment the basket is released, after being loaded with the proper number of bundles, it is free of the mechanism of the shocker, with the exception that it rests on the two arms. As the basket is falling, it is not drawn forward by the forward movement of the machine so that if a portion of the base of the shock touches the ground before all portions touch, that portion first touching the ground is not caused to change its relation to the basket or to any other portion of the shock. When the shock is on the ground, the basket remains with the shock long enough for it to become inert, the quick removal of the basket leaving the shock undisturbed.

It will also be seen that by so designing the mechanism that the basket is entirely free of the controlling mechanism of the machine for a given length of time, the basket can be discharged even on a curve, as the basket, when it falls, will always remain in alignment with the shock and not with the mechanism, since it is of the utmost importance that no impulse be given to the shock to disturb it after it reaches the ground.

It will be noticed, on referring to the drawings, that the inclination of the bottom 10 of the basket 7 is greater than the end of the shock when discharged onto the ground, Fig. 14. In the present instance, the angle is about forty degrees, while the angle of each end of the shock is about thirty degrees, although this may vary under certain conditions.

By constructing the basket in this manner, the bundles that were at the bottom of the basket and compacted by the weight of the bundles on top of them, are allowed to expand at their upper ends, slightly changing the angle of repose so that both ends of the shock will have about the same inclination. In no case will the angle change to such an extent as to cause the end bundles to fall over and disturb the symmetry of the shock.

The mechanism of the basket is timed with the mechanism of the other parts of the shocker and, in the present instance, with the bundling and knotting mechanism of the reaper and binder. In the present instance, the clutch sleeve 33 is actuated by a lever 81, which is released by a bolt 82 and which is thrown out by a cam lug 83 on the wheel 40. This bolt is actuated by a ratchet wheel 84, with which engages a bar 85 on an arm 86 connected to a beveled gear wheel 87 meshing with a gear wheel 88 having clutch teeth on its hub, which is loose on the axle 2. Splined to the axle is a clutch sleeve 89 controlled by a lever 90 having a spring bolt 91, which is engaged by a lug 92 on the bevel wheel 88 and which throws the clutch sleeve 89 out of engagement with the said wheel. The bolt 91 is withdrawn by a lever 93 connected by a link 94 to the operating mechanism of the bundling and binding device of the reaper. By this means the mechanism is arranged to act automatically.

I claim:

1. The combination in a shocking attachment for a reaper and binder, of a basket; means for transferring bundles of grain from the binder to the basket; means for holding the basket in position to receive the bundles; a loose connection between the basket and the machine, the basket being free from forwardly propelling force while in the act of falling and for a given length of time after it has fallen and deposited a shock on the ground and also being free from lateral movement of the machine so that the basket remains with the shock until the shock becomes inert; and means for withdrawing the basket from the shock and returning it to its first position.

2. The combination in a shocking attachment for reapers and binders, of a basket; means for loading the basket with bundles of grain from the binder, the bundles of grain assuming a position in relation to each other in the basket similar to the position they assume on the ground; means for releasing the basket so that it will be entirely free of the machine as regards any longitudinal movement so that it will fall towards the ground without disturbing the relation of the bundles with the basket in order that the bundles may form a shock in the same relation that they were in the basket; then abruptly withdrawing the basket from the shock, leaving the shock standing in proper position.

3. The combination in a shocker, of a basket in which bundles are placed to form a shock; and a platform located in the basket and free to tilt by the weight of the first bundles as they are placed in the basket.

4. The combination in a shocker, of a basket in which bundles are placed to form a shock, said basket having an inclined bottom; and a platform pivoted at the forward end of the basket and free to tilt when the first pair of bundles is placed in the basket.

5. The combination in a shocker, of a basket having an inclined bottom and arranged to receive bundles of grain to form a shock, of a platform pivoted at the front of the basket and free to tilt; and a spring for holding the platform in a substantially horizontal position, said spring yielding when the first bundles are placed in the basket, allowing the platform to tilt with the bundles.

6. In a grain shocking machine, the combination of a frame; a basket carried at the rear of the same; means for supporting said basket in the elevated position including arms upon which the edge of the basket rests; and means permitting the basket to tilt and fall upon the ground free of the forward movement of the machine after it has been dropped to discharge a formed shock.

7. The combination in a shocker, of a frame; a basket mounted on the frame in a vertical position; means for loading the basket with bundles of grain; a bar pivoted to the frame of the machine; a chain connecting the bar with the basket; a latch engaging the bar and retaining the basket in the receiving position; timing mechanism; means, actuated by the timing mechanism, to withdraw the latch from the bar and to allow the basket to fall and discharge its load; and a spring, connected to the bar and to the frame of the machine, for preventing the too rapid descent of the basket.

8. In a grain shocker, the combination of a frame; traction wheels therefor; a basket mounted on the frame so that it will be allowed to fall; a loose connection between the basket and the operating mechanism; a pivoted bar; a connection between the pivoted bar and the basket; means for holding said pivoted bar with the basket in the raised position; means for delivering a predetermined number of bundles to the basket; means for releasing the bar after a predetermined number of bundles has been delivered to said basket; and power means for positively returning the bar and the basket to the first position.

9. In a grain shocker, the combination of a frame; supporting means therefor; a basket on said frame; means for holding said basket in the elevated position; a driving shaft; a sectional sheave loose on the same; a spring connection between the outer and inner sections of said sheave; means for connecting the inner section to the shaft; and a chain passing around the outer section and connected to the basket, said outer section being turned to lift the basket.

10. The combination in a shocker, of a basket arranged to receive two bundles at a time; means for loading the basket with the bundles of grain; a bar connected to the basket; a latch holding the bar in position; timing mechanism arranged to release the bar and the basket when a given number of bundles is located in the basket so that the basket will be turned to discharge its load; and power driven means for returning the basket and the bar to the receiving position.

11. The combination in a shocker, of a basket; arms supporting the lower end of the basket, each arm having an extention; a chain loosely connected to a fixed point on the machine and to the lower end of the basket; means allowing the basket to turn to discharge its load, the arms sliding under the basket, which momentarily remains stationary to allow the shock to settle to permit the slack in the chain to be taken up, when the basket will be withdrawn from the shock and returned to its first position.

12. The combination in a shocking machine, of a frame; a basket supported in substantially a vertical position on the frame; a bar pivoted to the frame; a chain connecting the bar with the basket; a latch holding the bar in position; a rock shaft having arms supporting the lower end of the basket and having an arm controlled by the bar so that when the bar is released the shaft will rock and will allow the rear end of the basket to be lowered; a loose connection between the basket and the frame of the machine whereby the machine, after the basket is released, will move forward independently of the basket until the slack is taken up, when the basket will move with the machine; and means for returning the basket to its first position.

13. The combination in a shocking attachment for reapers and binders, of a frame; means for carrying the frame; wheels; a shaft driven by said wheels; a rock shaft having arms projecting rearwardly, said arms having extensions arranged at an angle to the body of the arms so as to form a crotch; a basket having an inclined bottom, the lower edge of the basket resting in the crotch of the arms; a support on which the basket rests; a bar connected to the basket; a latch for holding the bar with the basket in position to receive the bundles of grain; means, controlled by the movement of the shaft, for releasing the bar when a given number of bundles is in the basket; an arm on the rock shaft held by the bar so that when the bar is released, the arm will also be released, allowing the shaft to rock so as to lower the rear end of the basket; chains loosely connecting the lower end of the basket with the machine so that when the basket falls it will fall clear of the machine and will remain with the shock until the shock is substantially inert on the ground, after which the basket is withdrawn on the continued movement of the machine; and means for returning the basket to its first position.

14. The combination in a shocker, of a frame; a basket carried thereby and arranged to receive a number of bundles of grain to form a shock; a pivoted bar connected to the basket; means for holding the bar to retain the basket in the receiving position; and a spring connected to the bar and to the frame so arranged in respect to the pivot of the bar that it tends to partly counterbalance the bar and basket when the bar is released, retaining the bar in the extreme opposite position until the bar is returned by power to its first position.

15. The combination in a shocker, of a frame; a basket carried by the rear of the frame; a bar; a chain connecting the bar with the basket; a latch engaging the bar and holding the basket in the receiving position; a spring arranged to partly counterbalance the basket and connected to the bar and the frame; a loose connection between the basket and the frame; and means for automatically releasing the latch; and automatic means for returning the basket to its receiving position after discharging a shock.

16. The combination in a shocker, of a frame; a basket mounted thereon; a bar pivoted to the frame; a chain connecting the bar with the basket; means for holding the bar so as to retain the basket in the receiving position; means for releasing the bar; means for returning the bar and basket to their first positions; and a chain connecting the lower end of the basket with the frame, both of said chains being of such length that they are slack when the basket falls to the ground in order to allow the basket to remain momentarily with the shock.

17. The combination in a shocker, of a frame; a traction wheel; a shaft operated by the traction wheel; a Geneva movement; gearing between the Geneva movement and the main shaft; a latch controlled by the Geneva movement; a pivoted bar engaged by the latch; a basket mounted on the frame and held in place by the bar; a slack connection between the basket and the frame so that, when the latch is withdrawn, the basket is allowed to fall free of the machine, permitting the shock, formed by the assembled bundles of grain, to be discharged onto the ground, and, when the slack is taken up, the basket is withdrawn from the shock; and means for returning the bar and basket to their first position.

18. The combination in a shocker, of a frame arranged to be connected to a reaper and binder; a basket carried by the frame; means for loading the basket with bundles of grain to form a shock; means for holding the basket in the receiving position; means for automatically releasing the basket when a certain number of bundles have been placed therein; a slack connection between the basket and the frame; means for returning the basket to its first position, said means consisting of a two-part sheave; a spring connecting the two parts, one part having a lug arranged to engage a lug on the other part when a certain portion of the spring is taken up; and a chain connecting the sheave with the basket so that the basket will have time to fall clear of the machine in order to discharge its load and be retracted before returning to its first position.

19. The combination in a grain shocker, of a frame; a driven shaft; a basket carried by said frame and connected thereto at its lower end; a bar pivoted to the frame and connected to the basket; means for holding and releasing the bar and basket to discharge a formed shock; a clutch on the driven shaft controlling this means; means for returning the bar and basket to their first positions; a clutch on the driven shaft for controlling this latter means; means for forcing the clutch out of engagement and means for holding it; and release mechanism for the clutch actuated when the basket is released.

20. The combination in apparatus for depositing a number of bundles of grain on the ground to form a shock, of a frame; a basket; means for loading the basket with bundles of grain; means for holding the basket in a receiving position; means for releasing the basket; and a loose connection between the frame and the lower end of the basket, which leaves the basket free from a forwardly propelling force during its movement from the receiving position to the discharging position.

21. The combination in apparatus for depositing a number of bundles of grain to form a shock, of a frame; a basket; means for filling the basket with bundles of grain; means for holding the basket in the receiving position; and a loose connection between the lower end of the basket and the frame, said connection being such that the basket is freed from all propulsive contact with the machine so as to permit it to remain in a fixed position in relation to the ground from the time it is released to fall, while in the act of falling, and for a given length of time after it has fallen and has deposited a shock on the ground.

22. The combination in apparatus for depositing a number of bundles of grain on the ground to form a shock, of a basket; a divider secured to and forming part of the basket; means for loading the basket with bundles of grain on each side of the divider; means for holding the basket in a receiving position; means for releasing the basket; and a connection between the frame and the basket, leaving the latter free from forwardly propelling force during the movement of the basket from its receiving to its discharging position.

GEORGE INNES.